United States Patent
Yin et al.

(10) Patent No.: US 10,719,441 B1
(45) Date of Patent: Jul. 21, 2020

(54) USING PREDICTIONS OF OUTCOMES OF CACHE MEMORY ACCESS REQUESTS FOR CONTROLLING WHETHER A REQUEST GENERATOR SENDS MEMORY ACCESS REQUESTS TO A MEMORY IN PARALLEL WITH CACHE MEMORY ACCESS REQUESTS

(71) Applicant: Advanced Micro Devices, Inc., Santa Clara, CA (US)

(72) Inventors: Jieming Yin, Bellevue, WA (US); Yasuko Eckert, Redmond, CA (US); Matthew R. Poremba, Shaverton, PA (US); Steven E. Raasch, Boston, MA (US); Doug Hunt, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/274,146

(22) Filed: Feb. 12, 2019

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC .......................... G06F 12/0802; G06F 2212/60
USPC .................................................. 711/137, 118
See application file for complete search history.

(56) References Cited

U.S. PATENT DOCUMENTS

| | | | |
|---|---|---|---|
| 2006/0041723 A1* | 2/2006 | Hakura | G06F 12/0862 711/137 |
| 2008/0229070 A1* | 9/2008 | Charra | G06F 9/383 712/207 |
| 2014/0129780 A1* | 5/2014 | Bade | G06F 12/0862 711/137 |
| 2014/0143502 A1* | 5/2014 | Loh | G06F 12/0804 711/137 |
| 2014/0258622 A1* | 9/2014 | Lacourba | G06F 12/0862 711/122 |
| 2018/0157589 A1* | 6/2018 | Jayasena | G06F 12/084 |
| 2018/0173637 A1* | 6/2018 | Shifer | G06F 12/0891 |
| 2019/0018772 A1* | 1/2019 | Hinrichs | G06F 12/0897 |
| 2019/0079877 A1* | 3/2019 | Gaur | G06F 12/128 |
| 2019/0179758 A1* | 6/2019 | Kalyanasundharam | G06F 12/0831 |

* cited by examiner

*Primary Examiner* — Hong C Kim
(74) *Attorney, Agent, or Firm* — Park, Vaughan, Fleming & Dowler LLP

(57) ABSTRACT

An electronic device handles memory access requests for data in a memory. The electronic device includes a memory controller for the memory, a last-level cache memory, a request generator, and a predictor. The predictor determines a likelihood that a cache memory access request for data at a given address will hit in the last-level cache memory. Based on the likelihood, the predictor determines: whether a memory access request is to be sent by the request generator to the memory controller for the data in parallel with the cache memory access request being resolved in the last-level cache memory, and, when the memory access request is to be sent, a type of memory access request that is to be sent. When the memory access request is to be sent, the predictor causes the request generator to send a memory request of the type to the memory controller.

21 Claims, 6 Drawing Sheets

USING PREDICTIONS OF OUTCOMES OF CACHE MEMORY ACCESS REQUESTS FOR CONTROLLING WHETHER A REQUEST GENERATOR SENDS MEMORY ACCESS REQUESTS TO A MEMORY IN PARALLEL WITH CACHE MEMORY ACCESS REQUESTS

GOVERNMENT RIGHTS

This invention was made with government support under the PathForward Project with Lawrence Livermore National Security (prime contract no. DE-AC52-07NA27344, subcontract no. B620717) awarded by the DOE. The government has certain rights in this invention.

BACKGROUND

Related Art

Some electronic devices include processors that execute program code for performing various operations. For example, the electronic devices may include one or more central processing unit (CPU) cores or graphics processing unit (GPU) cores that execute program code for software applications, operating systems, etc. Many of these electronic devices, along with a memory (e.g., a "main" memory) and a mass-storage device, include one or more cache memories for storing data ("data," as used herein, is a generic term that is intended to cover program code, data, and other information and values). For example, some electronic devices include a hierarchy of cache memories in which each of two or more cache memories are located in respective levels. Cache memories are fast-access memories that are used for locally storing copies of data to enable rapid retrieval by processors for use when executing program code or performing other operations. Accessing copies of data in cache memories is typically at least an order of magnitude faster than accessing the data in the memory or the mass-storage device.

Although accessing copies of data that are present in cache memories is relatively fast, processors are still exposed to the delay of acquiring data from memory when such data is not already present in cache memories. Designers have therefore proposed numerous techniques for controlling when and how copies of data are acquired from memory to be stored in cache memories in attempts to have more useful data available in cache memories. For example, in some electronic devices, a speculative read mechanism is used to speed up the acquisition of data from memory for storage in a last-level cache memory (among cache memories in a hierarchy of cache memories with multiple levels). In these electronic devices, in parallel with resolving cache memory access requests for data in the last-level cache memory (i.e., determining whether or not the cache memory access requests can be satisfied using data in the cache memory), the electronic device sends speculative memory access requests to a memory controller in the memory. Generally, a speculative memory access request is "speculative" in that the speculative memory access request is not specifically caused by executing particular program code instructions, but instead is used to prepare the memory controller to return the data based on an assumption that the data is not present in the cache memory. In other words, the request generator, in view of an assumption that the cache memory access request will miss in the cache memory, and that the data will therefore need to be acquired from memory, attempts to speed up the acquisition of data from the memory by requesting that the memory start operations for acquiring the data from memory before the cache memory access request is actually resolved in the cache memory.

When handling speculative memory accesses, the memory controller commences the acquisition of data from the memory, but does not immediately return the data to the cache memory. Instead, the memory retrieves the data from a corresponding location in memory, but discards the data if a demand memory access request for the data has not been received from the request generator in the cache memory. Such a demand memory access request is sent by the request generator when the cache memory access request misses in the cache memory. In these electronic devices, therefore, the memory controller is caused, via the speculative memory access request, to start the process of acquiring data for return in response to a demand memory access request, but will discard the data if the demand memory access request is not received.

Although the speculative data fetching technique can be helpful for speeding up data acquisition when cache memory access requests miss in the cache memory, the technique has detriments. For example, when the cache memory access request hits—and therefore can be satisfied using data that was already present in the cache memory—the speculative memory access request causes unnecessary traffic on a fabric in the electronic device (i.e., a memory bus or other communication route), causes the memory controller to perform unneeded memory access operations, etc.

BRIEF DESCRIPTION OF THE FIGURES

Throughout the figures and the description, like reference numerals refer to the same figure elements.

DETAILED DESCRIPTION

Figure 1:
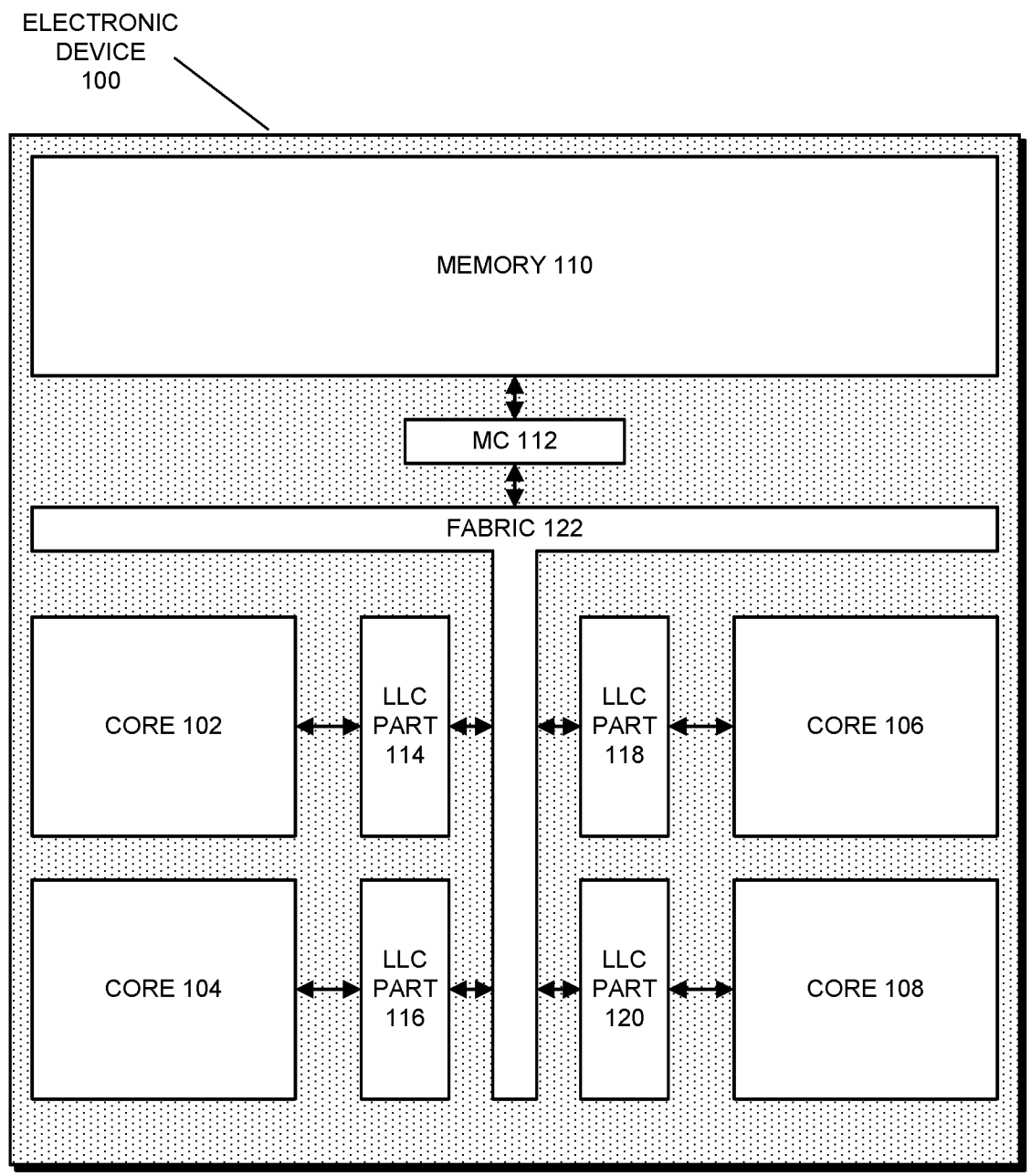
FIG. 1 presents a block diagram illustrating an electronic device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of a few of these terms. Note that the terms may have significant additional aspects that are not recited herein for clarity and brevity and thus the description is not intended to limit the terms.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element, etc. A functional block can include any number of circuit elements, from a single circuit element (e.g., a single integrated circuit logic gate) to millions or billions of circuit elements (e.g., an integrated circuit memory).

Data: data refers to information or a value that can be stored in a cache memory or a memory (e.g., a main memory). For example, data can be or include information or a value that is to be used for or that is produced by an operation such as a computational operation, a control operation, a sensing or monitoring operation, a memory access operation, an input-output device communication, etc. As another example, data can be or include program code instructions or values from program code (e.g., variable values, constants, etc.) acquired from or destined for a computer-readable storage medium, a mass-storage device, a network interface, a memory, etc. As another example, data can be or include information acquired from or destined for functional blocks such as input-output devices, sensors, human interface devices, etc.

Substantially immediately: as used herein, "substantially immediately" means without unusual delay and typically with no delay. An operation may be performed substantially immediately by performing that operation as soon as a condition arises under which the operation might be performed and/or as soon as it is known that the operation can be or should be performed. For example, a memory access request for data may be processed substantially immediately by a memory controller by commencing operations for handling the memory access request upon receiving the memory access request. As another example, a speculative type of memory access request may be sent substantially immediately by sending the speculative type of memory access request as soon as a corresponding cache memory access request is processed in a prediction mechanism.

Overview

In the described embodiments, an electronic device includes a processor (e.g., a central processing unit (CPU) or graphics processing unit (GPU)), a memory (e.g., a main memory), and a last-level cache memory. The last-level cache memory is a cache memory to which data is initially copied when the data is acquired from memory. For example, in some embodiments, the last-level cache memory is the lowest cache memory in a hierarchy of two or more cache memories. In the described embodiments, the processor (and/or another accessing entity) sends cache memory access requests for data to the last-level cache memory to acquire data for processing operations, etc. When the last-level cache memory cannot satisfy a cache memory access request, i.e., when the cache memory access request "misses" in the last-level cache memory due to a copy of the data for satisfying the cache memory access request not being present in the last-level cache memory, the last-level cache memory can send a demand memory access request to the memory to acquire a copy of the data. The acquisition of copies of data from the memory is a longer-latency operation. In an effort to avoid some of the latency associated with acquiring data from memory, the last-level cache memory uses speculative types of memory access requests for assisting with acquiring data from memory. Generally, "speculative" types of memory access requests are optional memory access requests that the last-level cache memory sends to memory to cause the memory to perform operations for speeding up the acquisition of data. Unlike existing electronic devices that use a speculative read mechanism for which speculative memory access requests are automatically sent to the memory for every cache memory access request, the described embodiments use a predictor to selectively send speculative types of memory access requests to the memory. In the described embodiments, the predictor determines likelihoods that cache memory access requests will hit (or miss) in the last-level cache memory. Based on the determined likelihoods, the predictor controls both: (1) whether (or not) speculative types of memory access requests are sent to the memory and (2) what speculative types of memory access requests are sent to the memory.

In some embodiments, a prediction mechanism in the predictor is trained to determine the likelihoods that cache memory access requests will hit in the last-level cache memory. For example, in some of these embodiments, the prediction mechanism is trained by providing indications of outcomes of one or more completed last-level cache memory access requests, such as a list of addresses accessed in the last-level cache memory along with addresses where hits (or misses) occurred. Based on the indications of the outcomes, the prediction mechanism makes the determinations. The particular operations for configuring the prediction mechanism depend on the type of prediction mechanism in use. These embodiments can use any type prediction mechanism that can be used for determining the likelihoods based on the indications of the outcomes. For example, in some embodiments, the prediction mechanism includes multi-bit counters, correlating predictors, pattern records, and/or other records associated with individual addresses in the memory or combinations thereof (e.g., a single prediction for addresses in pages or regions of memory). In some embodiments, the training is dynamic, and thus the prediction mechanism continues to be updated using the resolution of some or all cache memory access requests as the electronic device operates.

In the described embodiments, a request generator in or associated with the last-level cache memory can send a demand memory access request to the memory—or, rather, to a memory controller in the memory—which handles memory access requests. The demand memory access request is a non-speculative and obligatory memory access request that the memory controller should satisfy by returning requested data to the last-level cache memory. In addition to the demand memory access request, in some embodiments, the request generator can send speculative types of memory access requests. Generally, the speculative types of memory access requests are elective/optional and are generated by the request generator to assist in the speedier acquisition of data from the memory in the event of a miss occurring in the last-level cache memory. The first of the speculative types of memory access requests is a "speculative" memory access request, which is a memory access request that causes the memory controller to substantially immediately retrieve a copy of the data from the given address in the memory to be used for satisfying a corresponding demand memory access request. Unless a demand memory access request is subsequently sent to the memory controller for the data (upon a miss occurring), the memory controller discards the data retrieved in response to the speculative memory access request. The speculative memory access request therefore "warms up" or prepares the memory controller to rapidly respond to the demand memory access request for the data from the given address. The second of the memory access requests that the request generator can speculatively send to the memory controller is a "prefetch" memory access request, which is a memory access request that causes the memory controller to substantially immediately acquire a copy of the data from the given address in the memory and return the data to the last-level cache memory. For a prefetch memory access request, if the corresponding cache memory access request misses in the last-level cache memory, the data has already been returned (or is being returned) in response to the prefetch memory access request and the demand memory access request is redundant—and can be canceled. By causing the memory controller to return the data earlier, the prefetch memory access request makes data available in the last-level cache memory more quickly than the data would be made available via the corresponding demand memory access request.

In some embodiments, for controlling whether (or not) speculative types of memory access requests are sent to the memory and what speculative types of memory access requests are sent to the memory, the predictor maintains a number of likelihood thresholds. In some of these embodiments, the likelihood thresholds divide a full range of possible likelihoods into three regions. The three regions can generally be regarded as: (1) lower likelihood of hitting in the last-level cache memory, (2) middling likelihood of hitting (or missing) in the last-level cache memory, and (3) higher likelihood of hitting in the last-level cache memory. For example, if the complete range of possible likelihoods is 0-1, a first threshold may be at 0.3 and a second threshold may be at 0.75, dividing the likelihood range into the three regions. The likelihood thresholds can be statically set, e.g., during a startup operation, or dynamically set (and possibly reset) as the electronic device operates. For example, the likelihood thresholds can be updated based on the number of mispredicted last-level cache memory cache misses, a software program executed by the electronic device, a workload profile of the electronic device, etc.

In some embodiments, when the predictor is unable to determine the likelihood, e.g., when the prediction mechanism does not have a record for an address in a memory access request, the predictor causes the request generator to send a speculative memory access request to the memory controller. In some embodiments, sending the speculative memory access request is the default for the request generator in accordance with the speculative read mechanism—and will be performed unless the predictor otherwise causes the request generator to send another form of memory access. In other words, in these embodiments, the request generator will send a speculative memory access request unless the predictor causes the request generator to suppress the speculative memory access request—and possibly send another form of memory access request. Note that, in some embodiments, the predictor can send a different default speculative type of memory access request, such as the prefetch memory access request.

In some embodiments, when the determined likelihood is below the first threshold, and thus the memory access request is strongly predicted not to hit (i.e., to miss) in the last-level cache memory, the predictor causes the request generator to: (1) suppress the default speculative memory access request to the memory controller for the data; (2) send a prefetch memory access request to the memory controller; and (3) suppress a demand memory access request when (and if) the cache memory access request misses in the last-level cache memory. In this way, when the predictor has predicted that the memory access request is likely to miss in the last-level cache memory, the data is substantially immediately pulled from the memory into the last-level cache memory and the corresponding demand memory access request is blocked to avoid unnecessary traffic on a fabric (e.g., a memory bus, an interconnect, etc.) in the electronic device.

In some embodiments, when the determined likelihood is above the second threshold, and thus the memory access request is strongly predicted to hit in the last-level cache memory, the predictor causes the request generator to suppress the default speculative memory access request to the memory controller for the data. When and if the cache memory access request misses in the last-level cache memory, the request generator subsequently sends a demand memory access request to the memory controller for the data. In this way, when the predictor has predicted that the memory access request is likely to hit in the last-level cache memory, there are no speculative types of memory accesses sent to the memory controller, which reduces traffic on a communication fabric in the electronic device and can help to avoid unnecessary data access operations in the memory. In the case of a misprediction, and thus a miss in the last-level cache memory, these embodiments will experience the full data access delay, but, when the second threshold is set to an appropriate level, the delay should not effect a significant number of cache memory access requests in the last-level cache memory.

In some embodiments, when the determined likelihood is between the first threshold and the second threshold, and thus the memory access request is weakly predicted to hit (or miss) in the last-level cache memory (or to be unclear to predict), the predictor causes the request generator to send the default speculative memory access request to the memory controller. When (and if) the cache memory access request misses in the last-level cache memory, the request generator subsequently sends a demand memory access request to the memory controller for the data—which has already been retrieved from the memory in response to the speculative memory access request. In this way, when the predictor cannot clearly predict that the memory access request is likely to miss (or hit) in the last-level cache memory (i.e., cannot clearly determine whether the data is likely to be present in the last-level cache memory), the speculative memory access is sent to the memory controller to prepare for the possibility of the cache memory access missing in the last-level cache memory. This can help to speed the memory controller's response, if necessary, to a subsequent demand memory access request for the data, but does not load the data into the last-level cache memory until such loading is determined to be necessary, which avoids unnecessary traffic on the fabric, evicting useful resident data from the cache, etc.

By using the predictor to determine the likelihoods of cache memory access requests hitting (or missing) in the last-level cache memory and sending the speculative types of memory access requests to the memory based thereon, the described embodiments improve the existing speculative read mechanism. In comparison to the existing speculative read mechanism, the described embodiments can avoid unnecessary traffic on a fabric and avoid unnecessary memory access operations in a memory in the electronic device. In addition, the described embodiments can rapidly recover from misses in the last-level cache memory by prefetching requested data for cache memory access requests that are predicted to miss in the last-level cache memory. By better using electronic device resources while maintaining low last-level cache memory miss recovery times, the described embodiments can help to improve the overall performance of the electronic device (e.g., by more quickly performing computational operations, etc.). When the overall performance of the electronic device is improved, user satisfaction with the electronic device increases.

Electronic Device

FIG. 1 presents a block diagram illustrating electronic device 100 in accordance with some embodiments. As can be seen in FIG. 1, electronic device 100 includes cores 102-108 (collectively, "the cores"), memory 110, memory controller (MC) 112, last-level cache memory (LLC) parts 114-120 (collectively, "the last-level cache memory"), and fabric 122. Generally, the cores, memory 110, memory controller 112, the last-level cache memory, and fabric 122 are implemented in hardware, i.e., using various circuit elements and devices. For example, the cores, memory 110, memory controller 112, the last-level cache memory, and fabric 122 can be entirely fabricated on one or more semiconductor chips, including on one or more separate semiconductor chips, can be fashioned from semiconductor chips in combination with discrete circuit elements, can be fabricated from discrete circuit elements alone, etc. As described herein some or all of, the cores, memory 110, memory controller 112, the last-level cache memory, and fabric 122 perform operations for using speculative types of memory access requests to acquire data for assisting in satisfying cache memory access requests.

Cores 102-108 are functional blocks that perform computational and other operations in electronic device 100 (e.g., control operations, configuration operations, etc.). For example, cores 102-108 can be or include one or more microprocessors, central processing unit (CPU) cores, graphical processing unit (GPU) cores, accelerated processing units (APUs), and/or other processing functional blocks. Within some or all of cores 102-108, functional blocks and circuit elements such as instruction fetch/decode units, instruction scheduling units, arithmetic logic units (ALUs), floating point operation units, compute units, programmable gate arrays, etc. for executing program code and/or performing other operations.

Memory 110 is a functional block that performs operations of a memory (e.g., a "main" memory) for electronic device 100. Memory 110 includes volatile memory circuits such as fourth-generation double data rate synchronous DRAM (DDR4 SDRAM) and/or other types of memory circuits for storing data for use by functional blocks in electronic device 100 (recall that "data," as used herein, is a generic term that describes data, program code instructions, and/or other information and/or values that can be stored in a memory or a cache memory). Memory controller 112 is a functional block that handles accesses of the data that are stored in the memory circuits and for performing other control or configuration operations. As described herein, memory controller 112 performs operations for handling both speculative and non-speculative types of memory access requests.

Last-level cache memory parts 114-120 are functional blocks that include volatile memory circuits such as static random access memory (SRAM) circuits for storing copies of data for use by cores 102-108 (and/or other entities), as well as control elements for storing and accessing the copies of the data therein. In some embodiments, the individual last-level cache memory parts 114-120 collectively form (i.e., are part of) a last-level cache memory in electronic device 100. For example, last-level cache memory part 114 may be a first portion or slice of the last-level cache memory, last-level cache memory part 116 may be a second portion or slice, etc., so that a storage capacity of the last-level cache memory is the combined storage capacity of last-level cache memory parts 114-120. In some embodiments, cores 102-108 (and/or other entities) are permitted to access data in each of last-level cache memory parts 114-120, so that, e.g., core 102 can access data in a local last-level cache memory part (i.e., last-level cache memory part 114) or a remote last-level cache memory part (e.g., last-level cache memory parts 116-120) via fabric 122.

In some embodiments, last-level cache memory parts 114-120 are part of a hierarchy of cache memories in electronic device 100. In these embodiments, the hierarchy of cache memories includes one or more other cache memories that are also used for storing copies of data (but which, for clarity, are not shown in FIG. 1). For example, in some embodiments, the hierarchy of cache memories includes three levels of cache memories, a level one (L1) cache memory, a level two (L2) cache memory, and a level three (L3) cache memory, with the L3 cache memory being formed of/including last-level cache memory parts 114-120. In these embodiments, the L1 cache memory is considered the "highest" cache memory in the hierarchy and typically has the smallest storage capacity and the fastest response times among the cache memories in the hierarchy. The L3 cache memory is considered the "lowest" or "last level" cache memory in the hierarchy and typically has the largest storage capacity and the slowest response times among the cache memories in the hierarchy. In some embodiments, as data is copied from memory 110 into cache memories in the hierarchy, the data is first copied to the last-level cache memory (or to a given last-level cache memory part 114-120), and is propagated upward through the hierarchy of cache memories automatically or as needed.

Figure 2:
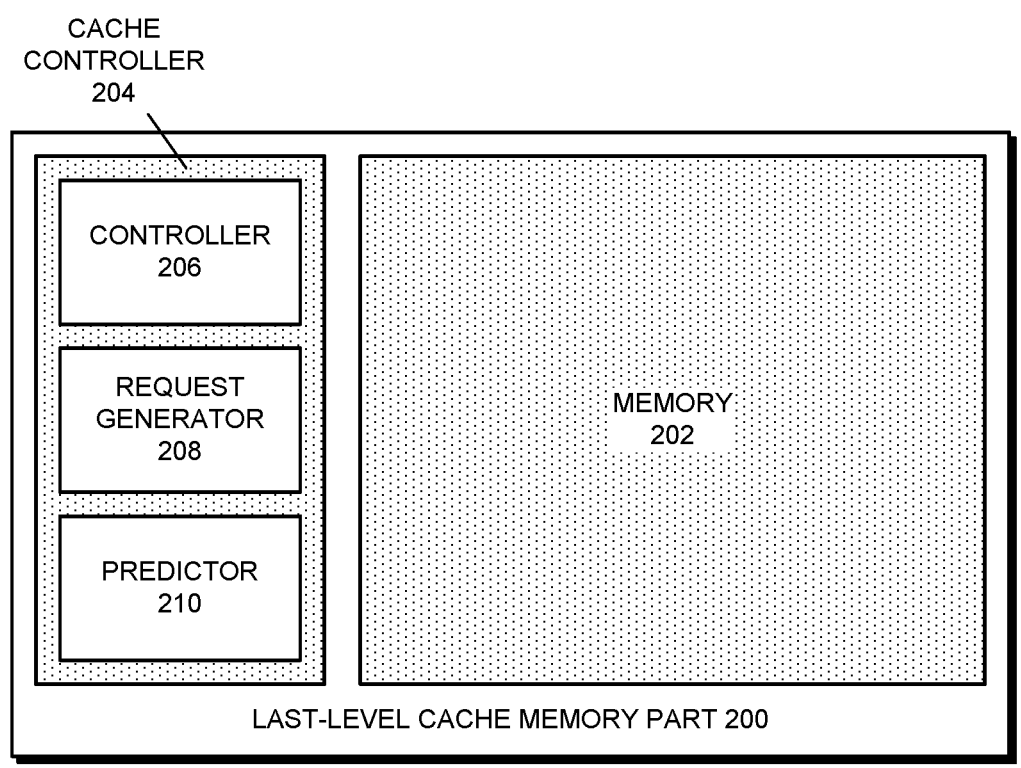
FIG. 2 presents a block diagram illustrating a last-level cache memory part in accordance with some embodiments.

FIG. 2 presents a block diagram illustrating a last-level cache memory part in accordance with some embodiments. In some embodiments, some or all of last-level cache memory parts 114-120 include functional blocks and elements similar to those shown in FIG. 2, although this is not a requirement. As can be seen in FIG. 2, last-level cache memory part 200 includes memory 202 and cache controller 204. Memory 202 includes the above-described memory circuits for storing copies of data. In some embodiments, the memory circuits in memory 202 are logically divided into numerous separate cache blocks (e.g., cache lines), such as 64 byte cache blocks, that are used for storing copies of data.

Cache controller 204 is a functional block that controls some or all of the operations of last-level cache memory part 200. Cache controller 204 includes controller 206, request generator 208, and predictor 210. Controller 206 is a functional block that includes various circuits and elements (e.g., a tag array, etc.) for controlling some or all of the operations of last-level cache memory part 200. For example, in some embodiments, controller 206 performs operations for storing data in and retrieving data from memory 202. The operations for storing data in memory 202 can include operations such as receiving a cache memory access request (i.e., write or store requests) to store data from a requesting entity (e.g., cores 102-108, lower caches in a hierarchy of cache memories, etc.) via a communication interface, determining cache blocks in memory 202 where data is to be stored, evicting existing copies of data from memory 202 to make room for new copies of data in accordance with a replacement policy, updating a tag array to identify data stored in memory 202, etc. The operations for retrieving data from last-level cache memory part 200 can include operations such as receiving cache memory access requests (i.e., read or load requests) from requesting entities via a communication interface, performing lookups in the tag array to determine if requested data is stored in memory 202, acquiring copies of data from cache blocks in memory 202, providing copies of data to requesting entities (e.g., cores 102-108) via the communication interface, etc.

Request generator 208 is a functional block that performs operations associated with acquiring copies of data from memory 110 for storage in last-level cache memory part 200. In some embodiments, request generator 208 can generate various types of memory access requests for acquiring data from memory 110. For example, in some embodiments, request generator 208 can generate both "non-speculative" and "speculative" types of memory access requests. Non-speculative types of memory access requests are generally compulsory memory access requests that are used to acquire copies of data from memory 110 for storage in last-level cache memory part 200 in situations such as after encountering a miss for a cache memory access request. Non-speculative types of memory access requests must be completed in order to correctly continue executing program code and/or for properly performing other operations in electronic device 100. In contrast, speculative types of memory access requests are elective or optional memory access requests that are used to improve the efficiency of acquiring data from memory 110 for storage in last-level cache memory part 200. Speculative types of memory access requests may, for example, be sent by request generator 208 to memory 110 (or, rather, to memory controller 112) to acquire copies of data for storage in memory 202 based on a prediction of a miss for a cache memory access request. In some embodiments, request generator 208 sends speculative types of memory access requests to memory controller 112 in parallel with corresponding cache memory access requests being resolved in the last-level cache memory. In these embodiments, the speculative types of memory access requests can cause memory controller 112 to at least commence the acquisition of data from memory 110 and possibly return the data in anticipation of a miss for the data in memory 202. In this way, the delay between the discovery of the miss in memory 202 and the acquisition of the data from memory 110 for responding to the cache memory access request is shortened.

Predictor 210 is a functional block that performs operations associated with controlling memory access requests that are sent by request generator 208 to memory controller 112 based at least in part on predictions of cache memory access requests hitting (or missing) in last-level cache memory part 200. Predictor 210 receives information about cache memory access requests received by cache controller 204 (e.g., addresses of data, etc.) and a prediction mechanism in predictor 210 determines a likelihood that the cache memory access requests will hit (or miss) in memory 202. Based on the likelihood, predictor 210 causes request generator 208 to send (or not send) specified speculative types of memory access requests to memory controller 112 as described herein.

In some embodiments, the prediction mechanism in predictor 210 is trained based on hits and/or misses for data at given addresses for cache memory access requests in last-level cache memory part 200 (or in cache blocks, groups or sets of cache blocks, pages of memory, etc.). In these embodiments, when a cache memory access request is processed by controller 206, the hit or miss for the data in memory 202 is detected by predictor 210 (or another entity). The detected hits and/or misses are then used to train the prediction mechanism, such as by updating saturating counters, correlating predictors, pattern records, and/or other records associated with individual addresses in the memory or combinations thereof (e.g., groups of cache blocks, pages of memory, etc.).

When trained, the prediction mechanism in predictor 210 is able to determine the likelihood that a cache memory access request for data at a given address will hit (or miss) in the last-level cache memory. For example, in some embodiments, the prediction mechanism generates a likelihood value representing the likelihood based on corresponding saturating counters, correlating predictors, pattern records, and/or other records. The likelihood value can be any value that represents one or more likelihoods. For example, in some embodiments, a two-bit likelihood value is used to represent, using value 00, a strong likelihood of missing; using value 01, a weak likelihood of missing; using value 10, a weak likelihood of hitting; and using value 11, a strong likelihood of hitting. In some embodiments, when the prediction mechanism has not been trained for a particular address, the prediction mechanism generates no likelihood value or a default likelihood value.

Fabric 122 is a functional block that includes communication mechanisms (e.g., signal routes or buses, transceivers, buffers, switches, etc.) that are used for communicating between functional blocks in electronic device 100. For example, in some embodiments, fabric 122 is, includes, or is used as a memory bus, so that functional blocks such as cache controller 204 can communicate memory access requests to memory controller 112 and receive data from memory controller in response. In some embodiments, fabric 122 is a packet bus or signal route on which packetized data is communicated between functional blocks.

Although a particular arrangement of last-level cache memory parts 114-120 is shown in FIG. 1, in some embodiments, a different number and/or arrangement of cache memories and/or cache memory parts are present. For example, in some embodiments, the last-level cache memory is a single functional block (is not divided between cores as shown). In addition, although one example of a hierarchy of cache memories is provided, different embodiments use different arrangements of cache memories in the hierarchy of cache memories—or include only the last-level cache memory. Generally, the described embodiments are operable with any arrangement of cache memories for which likelihoods can be determined and speculative/non-speculative types of memory access requests can be sent as described herein.

Although request generator 208 is shown as a single functional block in cache controller 204, in some embodiments, a different arrangement of functional blocks performs the operations herein described. For example, in some embodiments, controller 206 or another entity generates non-speculative memory access requests, and request generator 208 generates only speculative types of memory access requests. Generally, the described embodiments include sufficient functional blocks in last-level cache memory parts or elsewhere to generate and communicate memory access requests to memory controller 112 as described herein.

Electronic device 100 is simplified for illustrative purposes. In some embodiments, however, electronic device 100 includes additional or different functional blocks and elements. For example, electronic device 100 may include display subsystems, power subsystems, input-output (I/O) subsystems, etc. Electronic device 100 generally includes sufficient functional blocks and elements to perform the operations herein described.

Electronic device 100 can be, or can be included in, any device that performs computational operations. For example, electronic device 100 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof.

Speculative and Non-Speculative Types of Memory Access Requests

In the described embodiments, a request generator (e.g., request generator 208) sends "non-speculative" and "speculative" types of memory access requests to a memory controller (e.g., memory controller 112) in order to cause the memory controller to perform operations associated with acquiring copies of data from a memory (e.g., memory 110) for storage in a last-level cache memory (e.g., in memory 202 in last-level cache memory part 200). Speculative and non-speculative types of memory access requests differ in both the reasons why each type of memory access request is generated and how each type of memory access request is handled. Generally, non-speculative types of memory access requests are associated with or caused by particular cache memory access requests received from requesting entities (e.g., cores 102-108). For example, the request generator may generate a non-speculative type of memory access request in order to acquire data from memory for satisfying a particular cache memory access request that missed in the last-level cache memory. Non-speculative types of memory access requests are typically necessary for program code execution and/or other operations and cannot, for the sake of the correct operation of the electronic device, be entirely disregarded or dropped. In other words, because the data requested in a non-speculative type of memory access request is needed for program code execution and/or other operations, a non-speculative type of memory request should be satisfied or a serious error could occur.

In some embodiments, a "demand" memory access request is a non-speculative type of memory access request. The demand memory access request causes the memory controller to substantially immediately return specified data to the cache controller (i.e., return the data as soon as possible after the demand memory request is received). The request generator or another entity can generate a demand memory access any time that particular data is needed in the last-level cache memory, such as for acquiring data for responding to a cache memory access request that has missed in the last-level cache memory.

In contrast to non-speculative types of memory access requests, speculative types of memory access requests are typically voluntary, elective, or optional, and are generally used to assist in improving the operation of the last-level cache memory. Unlike non-speculative types of memory access requests, if a speculative type of memory access request is not satisfied, no risk is created to program code execution and/or other operations based on not being provided the corresponding data. This is true because speculative types of memory accesses assist in acquiring data that would otherwise be acquired using a non-speculative type of memory access request. For example, a speculative type of a memory access request may be sent in advance of when a non-speculative type of memory access request is sent in order to prepare the memory controller for subsequently responding to the non-speculative type of memory access request. As another example, a speculative type of memory access request may be sent as a replacement for an upcoming non-speculative type of memory access request, and the corresponding non-speculative type of memory access request—when and if the non-speculative type of memory access request occurs—may be discarded or dropped when data is returned for the speculative type of memory access request.

In some embodiments, a "speculative" memory access request is one speculative type of memory access request. The speculative memory access request causes the memory controller to substantially immediately acquire specified data from the memory for satisfying a subsequent demand memory access request and prepare the data for responding to a subsequent demand memory access request. The acquired data is not, however, immediately returned to the last-level cache memory. Instead, when the memory controller subsequently receives the corresponding demand memory access request, the memory controller has the data at the ready for responding to the demand memory access request. When the memory controller does not subsequently receive the corresponding demand memory access request, the memory controller discards the data. The data is therefore not automatically returned to the last-level cache memory based on the speculative memory access request, but is prepared for responding to the anticipated demand memory access request—which may not materialize. The request generator or another entity can generate a speculative memory access any time that particular data is expected to be requested using a demand memory access request. The speculative memory access request, due to the retention of the data in the memory (i.e., the data is not substantially immediately returned to the last-level cache memory), can help to speed up demand memory access requests without unnecessarily consuming bandwidth on a fabric in the electronic device, necessitating operations for the cache controller, causing useful data to be evicted from last-level cache memory, etc.

In some embodiments, a "prefetch" memory access request is another speculative type of memory access request. The prefetch memory access request causes the memory controller to substantially immediately acquire specified data from the memory and return the data to the last-level cache memory. The data is therefore automatically returned to the last-level cache memory based on the prefetch memory access request. The request generator or another entity can generate a prefetch memory access any time that particular data is needed in the last-level cache memory. For example, the request generator may send a prefetch memory access request for data to the memory controller anticipating that a demand memory access for the data is likely to be subsequently sent. Because the prefetch memory access request causes the memory controller to return the data, the demand memory access request is redundant and can be suppressed (i.e., dropped, not sent, etc.). In this way, when a demand memory request for data is anticipated (or at least the need for the data is anticipated), a prefetch memory access request can be sent early to acquire the data sooner than the data would otherwise be acquired using the demand memory access request. Using the prefetch memory access request can therefore speed up operations such as responding to cache memory access requests that miss in the last-level cache memory.

Thresholds

In the described embodiments, a predictor (e.g., predictor 210) compares likelihoods of cache memory access requests hitting (or missing) in a last-level cache memory to thresholds from among a set of thresholds to determine whether speculative types of memory access requests are to be sent to a memory and, if so, what types of memory access requests are to be sent to the memory. In some embodiments, the thresholds include a first threshold and a second threshold. In these embodiments, the first threshold is set to a likelihood value below which the predictor can relatively confidently predict that a cache memory access request is less likely to hit (i.e., is more likely to miss) in the last-level cache memory. The second threshold is set to a likelihood value above which the predictor can relatively confidently predict that a cache memory access request will hit in the last-level cache memory. For example, if the possible likelihood values range from 1-10 with 1 being a very strong possibility of missing and 10 being a very strong possibility of hitting, the first threshold can be set to 3 and the second threshold can be set to 7. In this example, the range between 3 and 7 are middling likelihood values for which a prediction of hit and/or miss is weak, ambiguous, and/or unclear.

In some embodiments, the first threshold is set to a value at which the likelihood hits for cache memory access requests is sufficiently low (and thus the likelihood of the cache memory access requests missing sufficiently high) to warrant substantially immediately retrieving the data from the memory. In other words, for likelihood values below the first threshold, there is enough of a probability that cache memory access requests will not hit (will miss) in the last-level cache memory that sending prefetch memory access requests will not, over a number of such cache memory access requests, result in inefficient use of resources in the electronic device (e.g., fabric bandwidth, memory system processing, etc.)—and should improve the speed of resolution of cache memory access requests that miss in the last-level cache memory.

In some embodiments, the second threshold is set to a value at which the likelihood of hits for cache memory access requests is sufficient to warrant predicting that the cache memory access request will encounter the data in the last-level cache memory. Based on such a prediction, speculative types of memory access requests will not be needed and speculative memory access requests for the data can be suppressed. In other words, for likelihood values above the second threshold, there is enough of a probability that cache memory access requests will hit in the last-level cache memory that suppressing the otherwise automatic speculative memory access request (as described herein) will not, over a number of such cache memory access requests, result in demand requests unnecessarily being held up/waiting for the entire delay of acquiring data from the memory. In addition, by suppressing the speculative memory access requests, resources in the electronic device (e.g., fabric bandwidth, memory system processing, etc.) can be more efficiently used.

In some embodiments, the first and/or second thresholds are set statically, such as at a startup of the electronic device, when the cache controller is configured, and/or at another time. In these embodiments, values for the first and/or second thresholds may be read or otherwise acquired from a configuration file, firmware, etc. and used to set the first and/or second thresholds in the predictor (e.g., for writing values to registers that hold the first and/or second thresholds).

In some embodiments, the first and/or second thresholds are dynamically updated at one or more times as the electronic device operates. For example, the first and/or second threshold may be updated when specified events occur, at given times, as electronic device workload profiles change, for certain program code execution, etc. In some embodiments, for dynamically updating the first and/or second thresholds, the predictor (or another entity) monitors a number of correct and/or incorrect hit (or miss) predictions and adjusts the first and/or second threshold based thereon. For example, the predictor may monitor for when predicted hits for data for cache memory access requests turned out to be incorrect (the data was not in the last-level cache memory), and may increase the second threshold when a sufficient number of predictions are incorrect. In this way, the predictor (or the other entity) can adapt the first and/or second thresholds to reflect present cache access patterns. For example, when program code switches from accessing data at addresses in a region of memory repeatedly (leading to larger numbers of hits in the last-level cache memory) to accessing data in sequential addresses in memory (leading to smaller numbers of hits in the last-level cache memory), the predictor (or other entity) can increase the second threshold so that predicting hits is more uncommon.

Processes for Using Speculative Types of Memory Accesses

In the described embodiments, a last-level cache memory uses speculative types of memory access requests to assist in acquiring data for responding to cache memory access requests. Generally, the last-level cache memory uses the speculative types of memory accesses to speed up the acquisition of data for which misses are encountered in the last-level cache memory, which can help to improve the efficiency of the last-level cache memory. FIGS. 3-6 present flowcharts illustrating the use (or not) of speculative types of memory access requests in the last-level cache memory in various cases.

Figure 3:
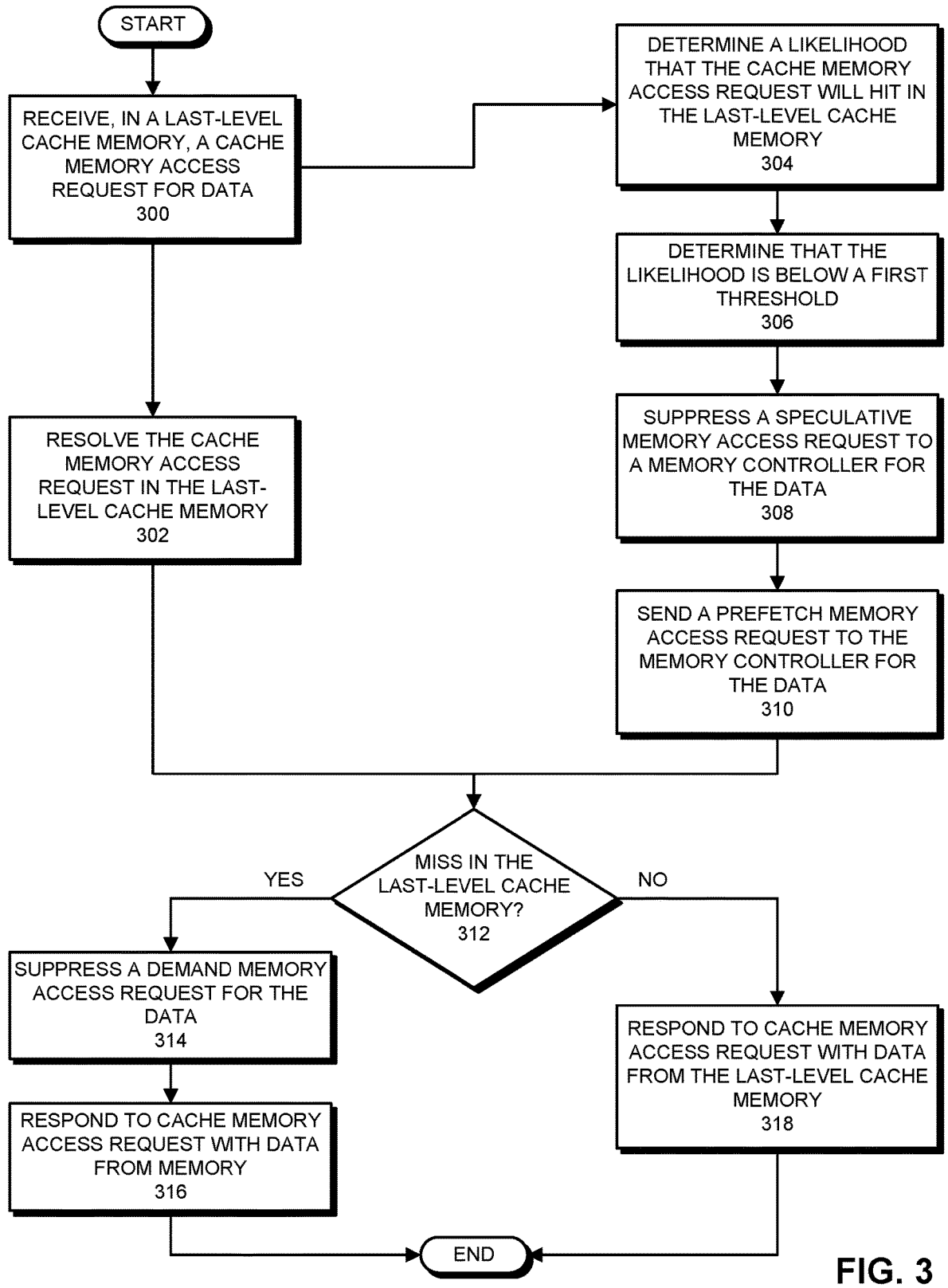
FIG. 3 presents a flowchart illustrating a process for using a prefetch memory access request to assist in acquiring data in a last-level cache memory in accordance with some embodiments.
Figure 4:
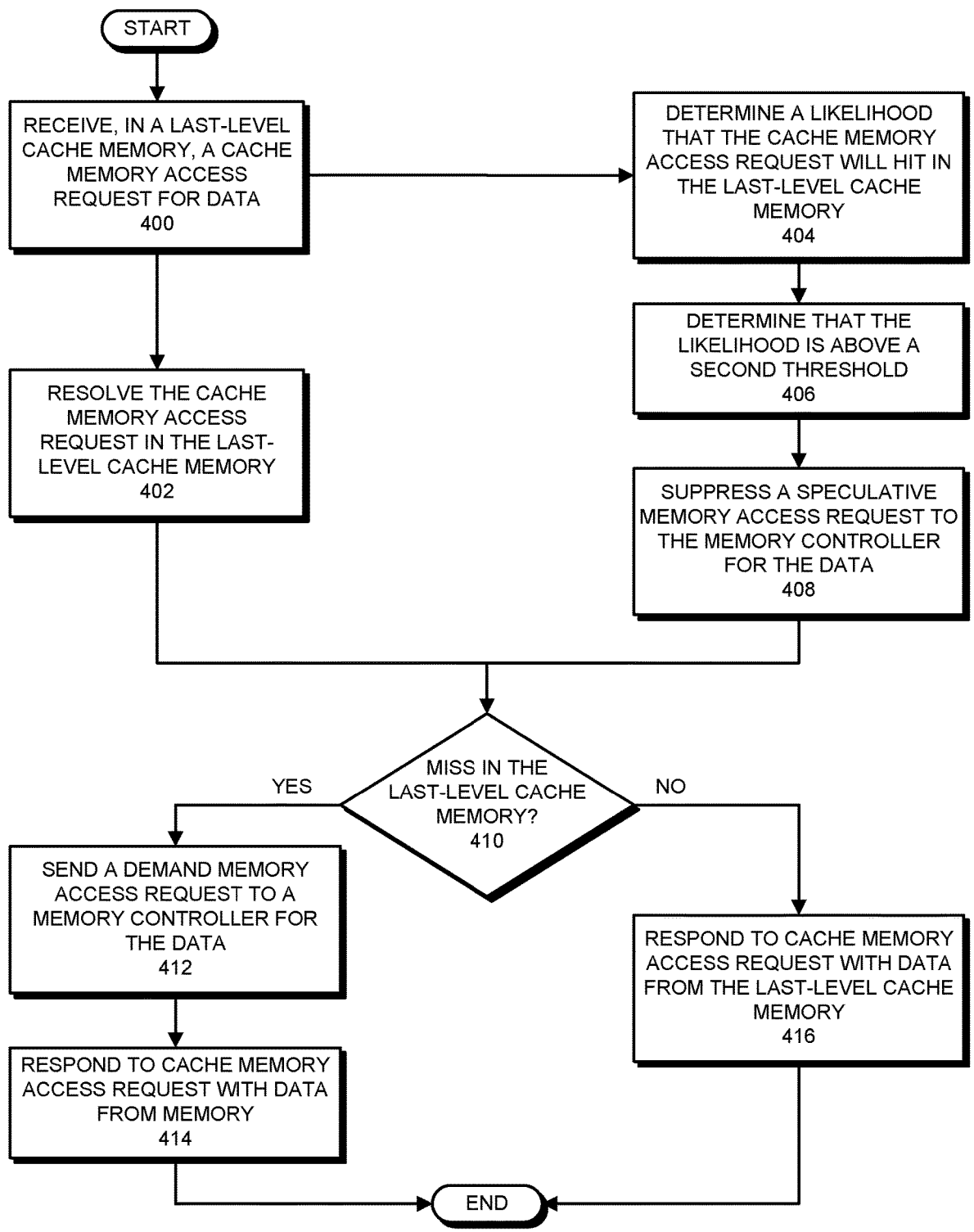
FIG. 4 presents a flowchart illustrating a process for suppressing a speculative memory access request in a last-level cache memory in accordance with some embodiments.
Figure 5:
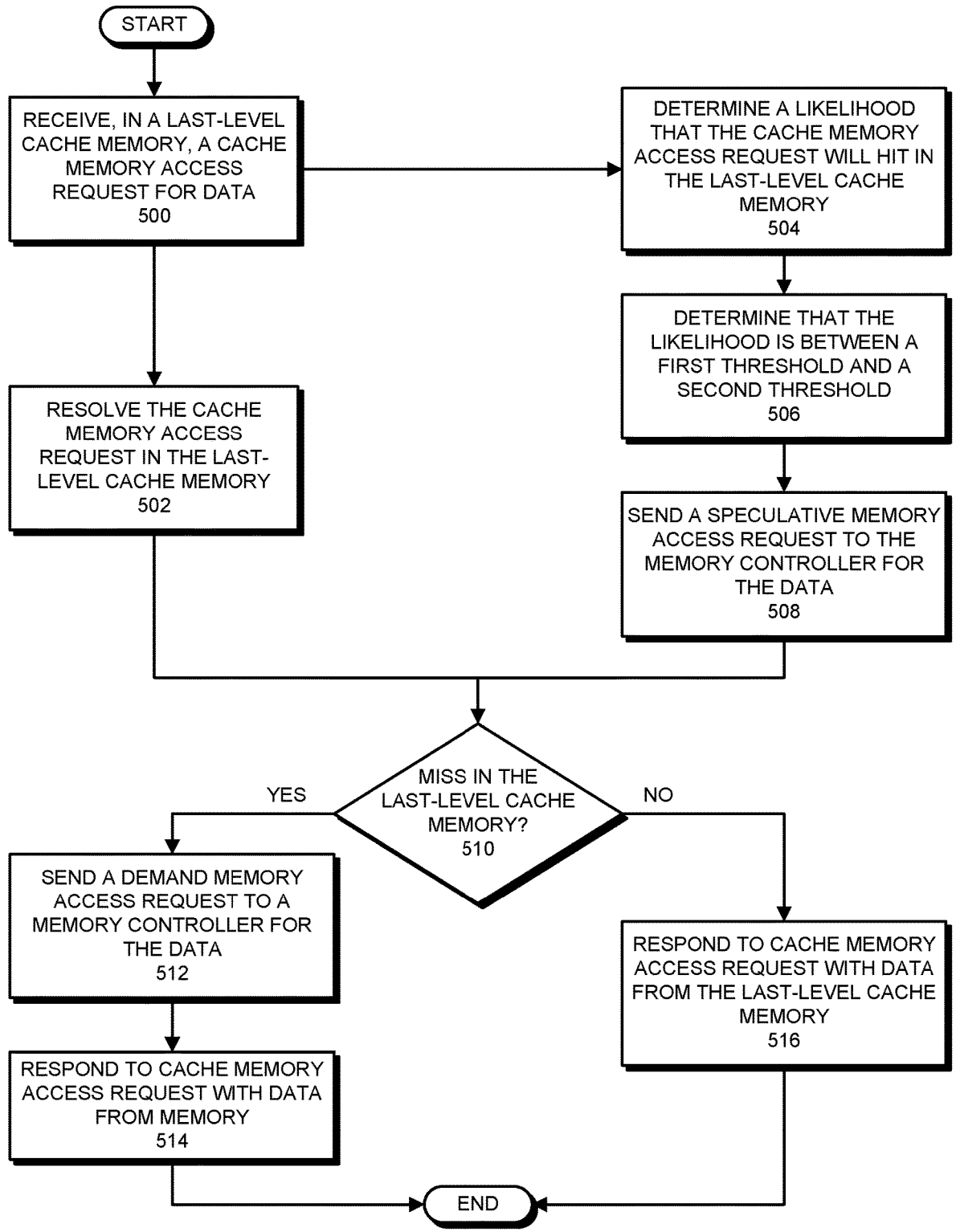
FIG. 5 presents a flowchart illustrating a process for using a speculative memory access request to assist in acquiring data in a last-level cache memory in accordance with some embodiments.
Figure 6:
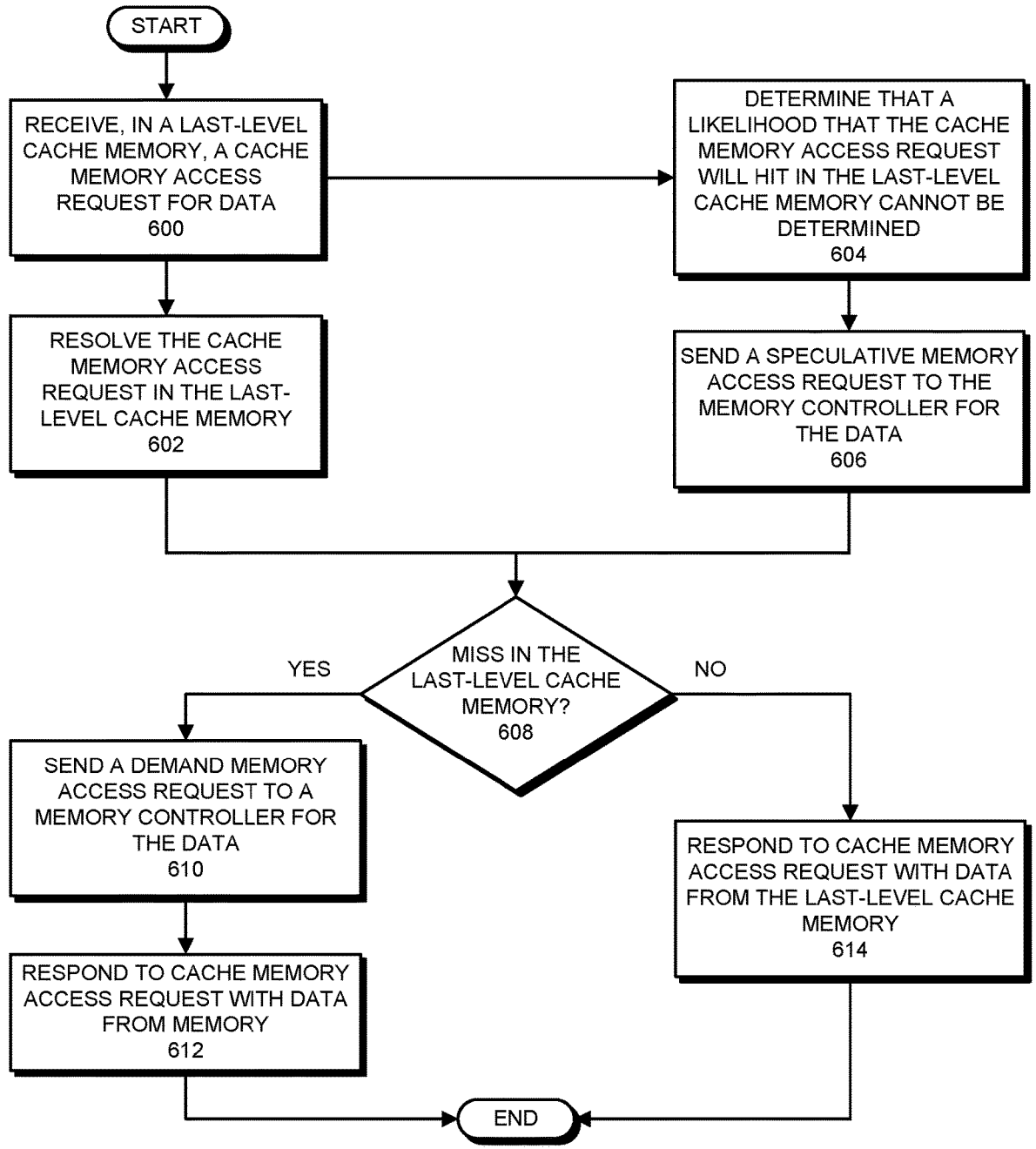
FIG. 6 presents a flowchart illustrating another process for using a speculative memory access request to assist in acquiring data in a last-level cache memory in accordance with some embodiments.

For the operations in FIGS. 3-6, it is assumed that the last-level cache memory uses a speculative read mechanism for assisting in acquiring copies of data from a memory for storage in a last-level cache memory. For the speculative read mechanism, upon receiving a cache memory access request, a cache controller (e.g., request generator 208 in cache controller 204) automatically, i.e., by default, sends a corresponding speculative memory access request to a memory controller in memory (e.g., memory controller 112 in memory 110) in order to prepare the memory controller for responding to an anticipated demand memory access request that will be sent when and if the cache memory access request misses in the last-level cache memory. In the described embodiments, however, the speculative read mechanism is modified in that a predictor (e.g., predictor 210) may suppress the automatic speculative memory access request and/or may convert the speculative memory access request into another type of memory access request. As described in more detail below, whether the automatic speculative memory access request is suppressed depends on a likelihood that a cache memory access request will hit (or miss) in the last-level cache memory. FIGS. 3-4 illustrate embodiments in which the automatic speculative memory access request is suppressed due to corresponding likelihoods of the cache memory access request hitting in the last-level cache memory. FIG. 5 shows an embodiment in which the automatic speculative memory access request is used due to the likelihood of the cache memory access request hitting in the last-level cache memory being insufficiently clear to warrant suppression and/or sending another speculative type of memory access request. FIG. 6 shows an embodiment in which the automatic speculative memory access request is used due to the predictor being unable to predict a likelihood of a cache memory access request hitting in the last-level cache memory (such as when the predictor has not yet been trained on a given address).

In addition, for the operations in FIGS. 3-6, it is assumed that the prediction mechanism in the predictor has been trained to determine the likelihoods of cache memory access requests hitting (or missing) in the last-level cache memory. The particular training operations used for training the prediction mechanism depend on the nature of the prediction mechanism, but are generally operations in which the outcomes of completed cache memory access requests are used to update records, lists, tables, variables, algorithms, weighted edges, etc. in the prediction mechanism so that likelihoods can subsequently be determined. For example, in an embodiment in which the prediction mechanism includes a saturating counter associated with addresses in memory, a given saturating counter can be updated for each hit or miss for a cache memory access request for the corresponding address. The described embodiments can use any type prediction mechanism that can be used for determining the likelihoods based on the indications of the outcomes. For example, in some embodiments, the prediction mechanism includes multi-bit counters, correlating predictors, pattern records, and/or other records associated with individual addresses in the memory or combinations thereof (e.g., a single prediction for addresses in pages or regions of memory), neural networks, lookup tables, binary trees, etc. In some embodiments, the training is dynamic and ongoing, and thus the prediction mechanism continues to be trained/updated using the resolution of some or all cache memory access requests as the electronic device operates.

In this description, the term "in parallel with" is used, such as when describing a first operation being performed in parallel with a second operation. Generally, "in parallel with" means that some or all of the first operation is performed at substantially the same time as the second operation. For example, a first functional block may perform the first operation and a second functional block may perform the second operation partially or wholly simultaneously (the first and second operations may take different times). As another example, the first and second operations may be performed in separate but interleaved time slices by a time-shared functional block. In some cases, for performing the first and second operations in parallel with one another, the first and second operations are started closely in time and possibly at a same time. For the example in FIG. 3, "in parallel with" means while the cache memory access request is resolved (e.g., by the cache controller), the predictor determines the likelihood and sends the prefetch memory access request as described below. This is shown in FIG. 3 by the two paths through the flowchart from step 300, with one path including step 302 and the other including steps 304-310.

FIG. 3 presents a flowchart illustrating a process for using a prefetch memory access request to assist in acquiring data in a last-level cache memory in accordance with some embodiments. Note that the operations shown in FIG. 3 are presented as a general example of operations performed by some embodiments. The operations performed by other embodiments include different operations, operations that are performed in a different order, and/or operations that are performed by different entities or functional blocks.

The operations in FIG. 3 start when a cache controller (e.g., cache controller 206) in a last-level cache memory (e.g., last-level cache memory part 114) receives a cache memory access request for data (step 300). For example, the cache controller may receive the request from a requesting entity such as a core (e.g., core 104), a higher-level cache memory, and/or another entity. The request specifies the type of access, e.g., a read or write, as well as specifying the data, such as by an address in memory (e.g., memory 110) where the data is located. The cache controller commences resolving the cache memory access request in the last-level cache memory (step 302). For example, the cache controller may perform a lookup in a tag array or other record to determine whether the requested data is available in memory elements (e.g., memory 202) in the last-level cache memory.

In parallel with resolving the cache memory access request in the last-level cache memory, a predictor (e.g., predictor 210) in the cache controller determines a likelihood that the cache memory access request will hit in the last-level cache memory (step 304). For this step, the prediction mechanism in the predictor computes, retrieves, and/or otherwise determines a likelihood value that represents a likelihood of the cache memory access request hitting in the cache memory. The particular operations performed by the prediction mechanism for determining the likelihood value depend on the type of prediction mechanism in use in the predictor. For example, when the prediction mechanism includes a saturating counter that is updated during a training operation based on prior hits (or misses) in the last-level cache memory, the prediction mechanism may retrieve the value of the counter and determine the likelihood value directly or indirectly from the value of the counter.

For the example in FIG. 3, it is assumed that the likelihood of the cache memory access request hitting in the last-level cache memory is low, which in turn indicates that the likelihood is relatively high that the cache memory access request will miss in the cache memory. In other words, based on the training of the predictor, the predictor predicts with higher confidence that the cache memory access request will not encounter the requested data in the last-level cache memory—and will therefore miss. This can occur, for example, when one or more previous cache memory access requests for data at the indicated address encountered misses in the last-level cache memory. Because the likelihood is relatively high that the cache memory access request will miss in the last-level cache memory, the cache controller can be predicted with higher confidence to need to acquire the data from memory for satisfying the cache memory access request.

The predictor then determines that the likelihood is below a first threshold (step 306). For this operation, the predictor compares the likelihood value to the first threshold and determines that the likelihood value is below the first threshold. For example, assuming that the likelihood value and the first threshold are numerical values, the predictor can perform a numerical comparison. As described above, when the likelihood value is below the first threshold value, it indicates that the likelihood of the cache memory access request missing in the last-level cache memory is relatively high—and thus the likelihood of the cache memory access request hitting in the last-level cache memory is relatively low.

Because the likelihood is below the first threshold (and a miss is predicted), the predictor suppresses a speculative memory access request for the data (step 308) and sends a prefetch memory access request to the memory controller for the data (step 310). For this operation, the predictor signals the request generator that the automatic/default speculative memory access request should not be sent, thus "suppressing" the speculative memory access request. The predictor also signals the request generator that a prefetch memory access request should be sent. Recall that the prefetch memory access request causes the memory controller to substantially immediately acquire specified data from the memory and return the data to the last-level cache memory. The data will therefore be present in the last-level cache memory, whether via already being stored in the last-level cache memory or being acquired from the memory via the prefetch memory access request.

When a miss occurs while resolving the cache memory access request in the last-level cache memory (step 312), the predictor (or another entity) suppresses a demand memory access request that would ordinarily be sent to the memory controller for acquiring the data in the event of a miss (step 314). The demand memory access request is suppressed because the demand memory access request is redundant with the prefetch memory access request for the data that was previously sent. The cache controller then responds to the cache memory access request with the data acquired from the memory (step 316)—which may also be stored in the last-level cache memory. On the other hand, when a hit occurs while resolving the cache memory access request in the last-level cache memory (step 312), the cache controller responds to the cache memory access request with data from the last-level cache memory (step 318)—and may discard the data returned in response to the prefetch request or may overwrite the existing data with the (same) data.

By sending the prefetch memory access request as described for FIG. 3, these embodiments substantially immediately pull the data into the last-level cache memory in anticipation of a miss in the last-level cache memory. This can enable the last-level cache memory to more rapidly respond to the cache memory access request following the discovery of the miss (should the miss occur). By suppressing the speculative memory access request and the demand request in the event of a miss hit in the last-level cache memory, unnecessary traffic on the fabric and processing by the memory controller is avoided.

FIG. 4 presents a flowchart illustrating a process for suppressing a speculative memory access request in a last-level cache memory in accordance with some embodiments. More specifically, for the process shown in FIG. 4, the predictor suppresses the automatic/default speculative memory access request that would otherwise be sent in accordance with the above-described speculative read mechanism because a cache memory access request is determined to be likely to hit in the last-level cache memory. Note that the operations shown in FIG. 4 are presented as a general example of operations performed by some embodiments. The operations performed by other embodiments include different operations, operations that are performed in a different order, and/or operations that are performed by different entities or functional blocks.

The operations in FIG. 4 start when a cache controller (e.g., cache controller 206) in a last-level cache memory (e.g., last-level cache memory part 114) receives a cache memory access request for data (step 400). For example, the cache controller may receive the request from a requesting entity such as a core (e.g., core 104), a higher-level cache memory, and/or another entity. The request specifies the type of access, e.g., a read or write, as well as specifying the data, such as by an address in memory (e.g., memory 110) where the data is located. The cache controller commences resolving the cache memory access request in the last-level cache memory (step 402). For example, the cache controller may perform a lookup in a tag array or other record to determine whether the requested data is available in memory elements (e.g., memory 202) in the last-level cache memory.

In parallel with resolving the cache memory access request in the last-level cache memory, a predictor (e.g., predictor 210) in the cache controller determines a likelihood that the cache memory access request will hit in the last-level cache memory (step 404). For this step, the prediction mechanism in the predictor computes, retrieves, and/or otherwise determines a likelihood value that represents a likelihood of the cache memory access request hitting in the cache memory. The particular operations performed by the prediction mechanism for determining the likelihood value depend on the type of prediction mechanism in use in the predictor. For example, when the prediction mechanism includes a saturating counter that is updated during a training operation based on prior hits (or misses) in the last-level cache memory, the prediction mechanism may retrieve the value of the counter and determine the likelihood value directly or indirectly from the value of the counter.

For the example in FIG. 4, it is assumed that the likelihood of the cache memory access request hitting in the last-level cache memory is relatively high. In other words, based on the training of the predictor, the predictor predicts with higher confidence that the cache memory access request will encounter the requested data in the last-level cache memory—and will therefore hit. This can occur, for example, when one or more previous cache memory access requests for data at the indicated address encountered hits in the last-level cache memory. Because the likelihood is relatively high that the cache memory access request will hit in the last-level cache memory, the cache controller can be predicted with higher confidence to not need to acquire the data from memory for satisfying the cache memory access request.

The predictor then determines that the likelihood is above a second threshold (step 406). For this operation, the predictor compares the likelihood value to the second threshold and determines that the likelihood value is above the second threshold. For example, assuming that the likelihood value and the second threshold are numerical values, the predictor can perform a numerical comparison. As described above, when the likelihood value is above the second threshold value, it indicates that the likelihood of the cache memory access request hitting in the last-level cache memory is relatively high—and thus the likelihood of the cache memory access request missing in the last-level cache memory is relatively low.

Because the likelihood is above the second threshold (and a hit is predicted), the predictor suppresses a speculative memory access request for the data (step 408). For this operation, the predictor signals the request generator that the automatic/default speculative memory access request should not be sent, thus "suppressing" the speculative memory access request.

When a miss occurs while resolving the cache memory access request in the last-level cache memory (step 410), the predictor (or another entity) sends a demand memory access request to the memory controller for acquiring the data (step 412). The cache controller then responds to the cache memory access request with the data acquired from the memory (step 414)—which may also be stored in the last-level cache memory. On the other hand, when a hit occurs while resolving the cache memory access request in the last-level cache memory (step 410), the cache controller responds to the cache memory access request with data from the last-level cache memory (step 416).

By suppressing the speculative memory access request as described for FIG. 4, these embodiments avoid traffic on the fabric and processing by the memory controller that are predicted to be unnecessary in view of the higher likelihood of a hit for the data in the last-level cache memory. This can help to conserve electrical power, enable other entities freer access to the memory, etc., which can help to improve the overall operation of the electronic device.

Note that the demand memory access request sent in step 412 experiences the full delay of acquiring data from the memory because the speculative memory access request (which might otherwise have started the memory controller on acquiring the data) was previously suppressed based on the incorrect prediction of a hit in the last-level cache memory. Although the demand memory access request may prove to be necessary, when the second threshold is set to an appropriate level, relying on the demand request should be relatively uncommon—and the detriments of occasionally relying on the demand memory access request to recover from mispredictions should be overcome by the benefits of suppressing unnecessary automatic speculative memory access requests.

FIG. 5 presents a flowchart illustrating a process for using a speculative memory access request to assist in acquiring data in a last-level cache memory in accordance with some embodiments. More specifically, for the process shown in FIG. 5, the predictor allows the automatic/default speculative memory access request to be sent in accordance with the above-described speculative read mechanism because the predictor is unable to clearly or strongly predict whether a cache memory access request will hit (or not) in the last-level cache memory. Note that the operations shown in FIG. 5 are presented as a general example of operations performed by some embodiments. The operations performed by other embodiments include different operations, operations that are performed in a different order, and/or operations that are performed by different entities or functional blocks.

The operations in FIG. 5 start when a cache controller (e.g., cache controller 206) in a last-level cache memory (e.g., last-level cache memory part 114) receives a cache memory access request for data (step 500). For example, the cache controller may receive the request from a requesting entity such as a core (e.g., core 104), a higher-level cache memory, and/or another entity. The request specifies the type of access, e.g., a read or write, as well as specifying the data, such as by an address in memory (e.g., memory 110) where the data is located. The cache controller commences resolving the cache memory access request in the last-level cache memory (step 502). For example, the cache controller may perform a lookup in a tag array or other record to determine whether the requested data is available in memory elements (e.g., memory 202) in the last-level cache memory.

In parallel with resolving the cache memory access request in the last-level cache memory, a predictor (e.g., predictor 210) in the cache controller determines a likelihood that the cache memory access request will hit in the last-level cache memory (step 504). For this step, the prediction mechanism in the predictor computes, retrieves, and/or otherwise determines a likelihood value that represents a likelihood of the cache memory access request hitting in the cache memory. The particular operations performed by the prediction mechanism for determining the likelihood value depend on the type of prediction mechanism in use in the predictor. For example, when the prediction mechanism includes a saturating counter that is updated during a training operation based on prior hits (or misses) in the last-level cache memory, the prediction mechanism may retrieve the value of the counter and determine the likelihood value directly or indirectly from the value of the counter.

For the example in FIG. 5, it is assumed that the likelihood of the cache memory access request hitting in the last-level cache memory is unclear (i.e., is not high, but is also not low). In other words, based on the training of the predictor, the predictor weakly predicts that the cache memory access request will (or will not) encounter the requested data in the last-level cache memory or weakly predicts a miss. This can occur, for example, when previous cache memory access requests for data at the indicated address encountered both hits and misses in the last-level cache memory. Because it is unclear whether the cache memory access request will hit in the last-level cache memory, it is unclear whether (or not) the cache controller will need to acquire the data from memory for satisfying the cache memory access request.

The predictor then determines that the likelihood is between a first threshold and a second threshold (step 506). For this operation, the predictor compares the likelihood value to the first threshold and the second threshold and determines that the likelihood value is between the first threshold and the second threshold (or, rather, neither below the first threshold nor above the second threshold). For example, assuming that the likelihood value and the first and second thresholds are numerical values, the predictor can perform respective numerical comparisons. When the likelihood value is above the first threshold and below the second threshold, the likelihood of the cache memory access request hitting in the last-level cache memory is unclear and cannot be strongly predicted.

Because the likelihood is between the first threshold and the second threshold (and a hit cannot be clearly predicted), the predictor sends a speculative memory access request for the data (step 508). For this operation, the predictor signals the request generator that the automatic/default speculative memory access request should be sent in accordance with the speculative read mechanism (or simply allows the automatic/default speculative memory access request to be sent). As described above, the speculative memory access request causes the memory controller to acquire the data from the memory for responding to a subsequent demand memory access request—although the data is not returned of the last-level cache memory until a corresponding demand memory access request is received by the memory controller.

When a miss occurs while resolving the cache memory access request in the last-level cache memory (step 510), the predictor (or another entity) sends a demand memory access request to the memory controller for acquiring the data (step 512). The cache controller then responds to the cache memory access request with the data acquired from the memory (step 514)—which may also be stored in the last-level cache memory. On the other hand, when a hit occurs while resolving the cache memory access request in the last-level cache memory (step 510), the cache controller responds to the cache memory access request with data from the last-level cache memory (step 516).

By sending the speculative memory access request as described for FIG. 5, these embodiments prepare the memory controller for responding to the demand request (should a demand request be sent). This can help to speed the response to the cache memory access request following a miss in the last-level cache memory, which can help to improve the overall operation of the electronic device.

FIG. 6 presents a flowchart illustrating a process for using a speculative memory access request to assist in acquiring data in a last-level cache memory in accordance with some embodiments. More specifically, for the process shown in FIG. 6, the predictor allows the automatic/default speculative memory access request to be sent in accordance with the above-described speculative read mechanism because the predictor is unable predict whether a cache memory access request will hit in the last-level cache memory. Generally, the operations in FIG. 6 are those that are performed when the predictor does not modify the speculative read mechanism—and the speculative memory access request is automatically sent for a cache memory access request as described above. Note that the operations shown in FIG. 6 are presented as a general example of operations performed by some embodiments. The operations performed by other embodiments include different operations, operations that are performed in a different order, and/or operations that are performed by different entities or functional blocks.

The operations in FIG. 6 start when a cache controller (e.g., cache controller 204) in a last-level cache memory (e.g., last-level cache memory part 114) receives a cache memory access request for data (step 600). For example, the cache controller may receive the request from a requesting entity such as a core (e.g., core 104), a higher-level cache memory, and/or another entity. The request specifies the type of access, e.g., a read or write, as well as specifying the data, such as by an address in memory (e.g., memory 110) where the data is located. The cache controller commences resolving the cache memory access request in the last-level cache memory (step 602). For example, the cache controller may perform a lookup in a tag array or other record to determine whether the requested data is available in memory elements (e.g., memory 202) in the last-level cache memory.

In parallel with resolving the cache memory access request in the last-level cache memory, a predictor (e.g., predictor 210) in the cache controller determines that a likelihood that the cache memory access request will hit in the last-level cache memory cannot be determined (step 604). For this step, the prediction mechanism in the predictor attempts to compute, retrieve, and/or otherwise determine a likelihood value that represents a likelihood of the cache memory access request hitting in the cache memory. The prediction mechanism, however, is unable to determine the likelihood value because, for example, the prediction mechanism may not be trained to determine that particular likelihood value, may have encountered an error in determining the likelihood value, etc. Note that, in some embodiments, a default likelihood value is used when the prediction mechanism is unable to otherwise determine the likelihood value—in which case the operations in, e.g., FIG. 5 may be performed.

Because the likelihood value cannot be determined, the predictor sends a speculative memory access request for the data (step 606). For this operation, the predictor signals the request generator that the automatic/default speculative memory access request should be sent in accordance with the speculative read mechanism. As described above, the speculative memory access request causes the memory controller to acquire the data from the memory for responding to a subsequent demand memory access request—although the data is not returned of the last-level cache memory until a corresponding demand memory access request is received by the memory controller.

When a miss occurs while resolving the cache memory access request in the last-level cache memory (step 608), the predictor (or another entity) sends a demand memory access request to the memory controller for acquiring the data (step 610). The cache controller then responds to the cache memory access request with the data acquired from the memory (step 612)—which may also be stored in the last-level cache memory. On the other hand, when a hit occurs while resolving the cache memory access request in the last-level cache memory (step 608), the cache controller responds to the cache memory access request with data from the last-level cache memory (step 614).

By sending the speculative memory access request as described for FIG. 6, these embodiments prepare the memory controller for responding to the demand request (should a demand request be sent). This can help to speed the response to the cache memory access request following a miss in the last-level cache memory, which can help to improve the overall operation of the electronic device.

In some embodiments, an electronic device (e.g., electronic device 100 and/or some portion thereof) uses code and/or data stored on a non-transitory computer-readable storage medium to perform some or all of the operations herein described. More specifically, the electronic device reads the code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, neural network processors or accelerators, field-programmable gate arrays (FPGAs), compute units, embedded processors, graphics processors (GPUs)/graphics cores, pipelines, accelerated processing units (APUs), caches/cache controllers, memories/memory controllers, functional blocks, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., electronic device 100, cache controller 204, memory controller 112, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device that handles memory access requests for data in a memory, the electronic device comprising:
a memory controller for the memory;
a last-level cache memory;
a request generator; and
a predictor, wherein the predictor:
determines a likelihood that a cache memory access request for data at a given address will hit in the last-level cache memory;
based on the likelihood, determines:
whether a memory access request is to be sent by the request generator to the memory controller for the data in parallel with the cache memory access request being resolved in the last-level cache memory; and
when the memory access request is to be sent, a type of memory access request that is to be sent; and
when the memory access request is to be sent, causes the request generator to send a memory request of the type to the memory controller.

2. The electronic device of claim 1, wherein, when the likelihood is below a first threshold, the predictor determines that a memory access request is to be sent and that the type of the memory access request is a prefetch memory access request, and causes the request generator to:
suppress a speculative memory access request to the memory controller for the data; and
send the prefetch memory access request to the memory controller, the prefetch memory access request causing the memory controller to substantially immediately acquire a copy of the data from the given address in the memory and provide the data to the last-level cache memory.

3. The electronic device of claim 2, wherein:
when the cache memory access request misses in the last-level cache memory, the predictor causes the request generator to suppress a demand memory access request for the data.

4. The electronic device of claim 2, wherein:
when the likelihood is above a second threshold, the predictor determines that a memory access request is not to be sent and causes the request generator to suppress the speculative memory access request to the memory controller for the data; and
when the cache memory access request misses in the last-level cache memory, the request generator sends a demand memory access request to the memory controller, the demand memory access request causing the memory controller to substantially immediately acquire a copy of the data from the given address in the memory and provide the data to the last-level cache memory.

5. The electronic device of claim 4, wherein:
when the likelihood is between the first threshold and the second threshold, the predictor determines that a memory access request is to be sent and that the type of the memory access request is a speculative memory access request, and causes the request generator to send the speculative memory access request to the memory controller, the speculative memory access request causing the memory controller to substantially immediately acquire a copy of the data from the given address in the memory and hold the data for satisfying a corresponding demand memory access request; and
when the cache memory access request misses in the last-level cache memory, the request generator sends a demand memory access request for the data at the given address to the memory controller, the demand memory access request causing the memory controller to substantially immediately provide the data held by the memory controller to the last-level cache memory.

6. The electronic device of claim 5, wherein:
the first threshold and the second threshold are dynamically set and reset based at least in part on a rate at which a plurality of cache memory access requests hit in the last-level cache memory.

7. The electronic device of claim 5, wherein:
the first threshold and the second threshold are statically set at a specified time.

8. The electronic device of claim 1, wherein the predictor:
receives indications of outcomes of a plurality of completed cache memory access requests for data at corresponding addresses in the last-level cache memory; and
based on indications of the outcomes, trains a prediction mechanism to determine likelihoods that subsequent cache memory accesses for data at the corresponding addresses will hit in the last-level cache memory.

9. The electronic device of claim 8, wherein the indications of the outcomes comprise one or more of:
an indication of cache memory access requests from among the plurality of cache memory access requests that hit in the last-level cache memory; and
an indication of cache memory access requests from among the plurality of cache memory access requests that missed in the last-level cache memory.

10. The electronic device of claim 1, wherein:
when the predictor is unable to determine the likelihood that the cache memory access request for data at the given address will hit in the last-level cache memory, the predictor causes the request generator to send a speculative memory access request to the memory controller in parallel with the cache memory access request being resolved in the last-level cache memory.

11. The electronic device of claim 1, wherein the last-level cache memory includes a local portion and one or more remote portions.

12. A method for handling memory access requests for data in a memory in an electronic device that includes the memory, a memory controller for the memory, a last-level cache memory, a request generator, and a predictor, the method comprising:
determining, by the predictor, a likelihood that a cache memory access request for data at a given address will hit in the last-level cache memory;
based on the likelihood, determining, by the predictor:
whether a memory access request is to be sent by the request generator to the memory controller for the data in parallel with the cache memory access request being resolved in the last-level cache memory; and
when the memory access request is to be sent, a type of memory access request that is to be sent; and
when the memory access request is to be sent, causing, by the predictor, the request generator to send a memory request of the type to the memory controller.

13. The method of claim 12, further comprising:
when the likelihood is below a first threshold, determining, by the predictor, that a memory access request is to be sent and that the type of the memory access request is a prefetch memory access request, and causing, by the predictor, the request generator to:
suppress a speculative memory access request to the memory controller for the data; and
send the prefetch memory access request to the memory controller, the prefetch memory access request causing the memory controller to substantially immediately acquire a copy of the data from the given address in the memory and provide the data to the last-level cache memory.

14. The method of claim 13, further comprising:
when the cache memory access request misses in the last-level cache memory, causing, by the predictor, the request generator to suppress a demand memory access request for the data.

15. The method of claim 13, further comprising:
when the likelihood is above a second threshold, determining, by the predictor, that a memory access request is not to be sent and causing, by the predictor, the request generator to suppress the speculative memory access request to the memory controller for the data; and when the cache memory access request misses in the last-level cache memory, sending, by the request generator, a demand memory access request to the memory controller, the demand memory access request causing the memory controller to substantially immediately acquire a copy of the data from the given address in the memory and provide the data to the last-level cache memory.

16. The method of claim 15, further comprising:
when the likelihood is between the first threshold and the second threshold, determining, by the predictor, that a memory access request is to be sent and that the type of the memory access request is a speculative memory access request, and causing, by the predictor, the request generator to send the speculative memory access request to the memory controller, the speculative memory access request causing the memory controller to substantially immediately acquire a copy of the data from the given address in the memory and hold the data for satisfying a corresponding demand memory access request; and
when the cache memory access request misses in the last-level cache memory, sending, by the request generator, a demand memory access request for the data at the given address to the memory controller, the demand memory access request causing the memory controller to substantially immediately provide the data held by the memory controller to the last-level cache memory.

17. The method of claim 16, further comprising:
dynamically setting and resetting, by the electronic device, the first threshold and the second threshold based at least in part on a rate at which a plurality of cache memory access requests hit in the last-level cache memory.

18. The method of claim 16, further comprising:
statically setting, by the electronic device, the first threshold and the second threshold at a specified time.

19. The method of claim 12, further comprising:
receiving, by the predictor, indications of outcomes of a plurality of completed cache memory access requests for data at corresponding addresses in the last-level cache memory; and
based on the indications of the outcomes, training, by the predictor, a prediction mechanism to determine likelihoods that subsequent cache memory accesses for data at the corresponding addresses will hit in the last-level cache memory.

20. The method of claim 19, wherein the indications of the outcomes comprise one or more of:
an indication of cache memory access requests from among the plurality of cache memory access requests that hit in the last-level cache memory; and
an indication of cache memory access requests from among the plurality of cache memory access requests that missed in the last-level cache memory.

21. The method of claim 12, further comprising:
when the predictor is unable to determine the likelihood that the cache memory access request for data at the given address will hit in the last-level cache memory, causing, by the predictor, the request generator to send a speculative memory access request to the memory controller in parallel with the cache memory access request being resolved in the last-level cache memory.

* * * * *